United States Patent [19]

Hulland et al.

[11] Patent Number: 4,486,755

[45] Date of Patent: Dec. 4, 1984

[54] COLLISION AVOIDANCE SYSTEM

[75] Inventors: Burton L. Hulland, Glenwood Landing; George B. Litchford, Northport, both of N.Y.

[73] Assignee: Litchstreet Co., Northport, N.Y.

[21] Appl. No.: 351,275

[22] Filed: Feb. 22, 1982

[51] Int. Cl.³ ............................................. G01S 13/78
[52] U.S. Cl. ................................ 343/6.5 LC; 343/455
[58] Field of Search .............. 343/6.5 R, 6.5 LC, 455, 343/398, 6.8 LC

[56] References Cited

U.S. PATENT DOCUMENTS

| | | | |
|---|---|---|---|
| 3,626,411 | 12/1971 | Litchford | 343/455 X |
| 3,680,115 | 7/1981 | Bickel et al. | 343/396 |
| 3,735,408 | 5/1973 | Litchford | 343/455 |
| 3,757,324 | 9/1973 | Litchford | 343/6.5 R |
| 3,858,210 | 12/1974 | Litchford | 343/11 R |
| 3,858,211 | 12/1974 | Litchford | 343/398 X |
| 3,875,570 | 4/1975 | Litchford | 343/455 X |
| 3,895,382 | 7/1975 | Litchford | 343/455 X |
| 3,921,172 | 11/1975 | Litchford | 343/398 X |
| 3,959,793 | 5/1976 | Litchford | 343/455 X |
| 4,021,802 | 5/1977 | Litchford | 343/455 |
| 4,027,307 | 5/1977 | Litchford | 343/455 X |
| 4,107,674 | 8/1978 | Funatsu et al. | 343/4 |
| 4,115,771 | 9/1978 | Litchford | 343/6 R |
| 4,128,839 | 12/1978 | McComas | 343/455 |
| 4,161,729 | 7/1979 | Schneider | 343/6.5 R |
| 4,196,434 | 4/1980 | Funatsu et al. | 343/455 |
| 4,293,857 | 10/1981 | Baldwin | 343/6.5 R |

FOREIGN PATENT DOCUMENTS

| | | | |
|---|---|---|---|
| 890497 | 2/1962 | United Kingdom | 343/398 |
| 1278451 | 6/1972 | United Kingdom | 343/455 |

OTHER PUBLICATIONS

Article entitled "New PWI for General Aviation Proposed" by Philip K. Klas, *Aviation Week & Space Technology* Dated Sep. 16, 1968.

Article entitled "Beacon Proximity Warning Unit Outlined", *Aviation Week & Space Technology* Dated Sep. 20, 1971.

Article entitled "Bendix Flight-Tests a 'Listen-In' PWI" by Philip K. Klass, *Aviation Week & Space Technology* Dated Sep. 25, 1972.

*Primary Examiner*—T. H. Tubbesing
*Assistant Examiner*—John B. Sotomayor
*Attorney, Agent, or Firm*—Brumbaugh, Graves, Donohue & Raymond

[57] ABSTRACT

A threat warning collision avoidance system at an Own station that produces pseudo range data, identity and, when available, differential altitude data from standard ATCRBS interrogations and Other station's replies, rejecting the identity and data from Other stations that are outside a proximity space surrounding Own station, and producing a threat alert signal and displaying the identity and associated data of any Other station entering said proximity space.

34 Claims, 4 Drawing Figures

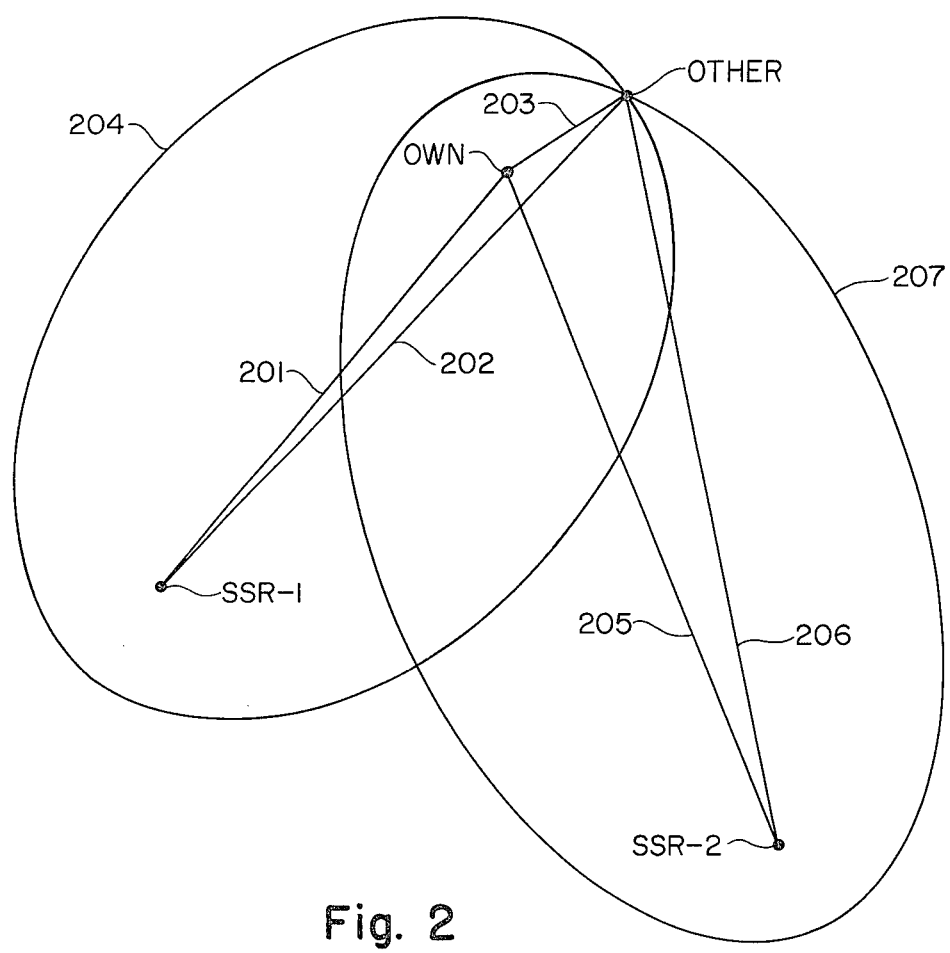
Fig. 2
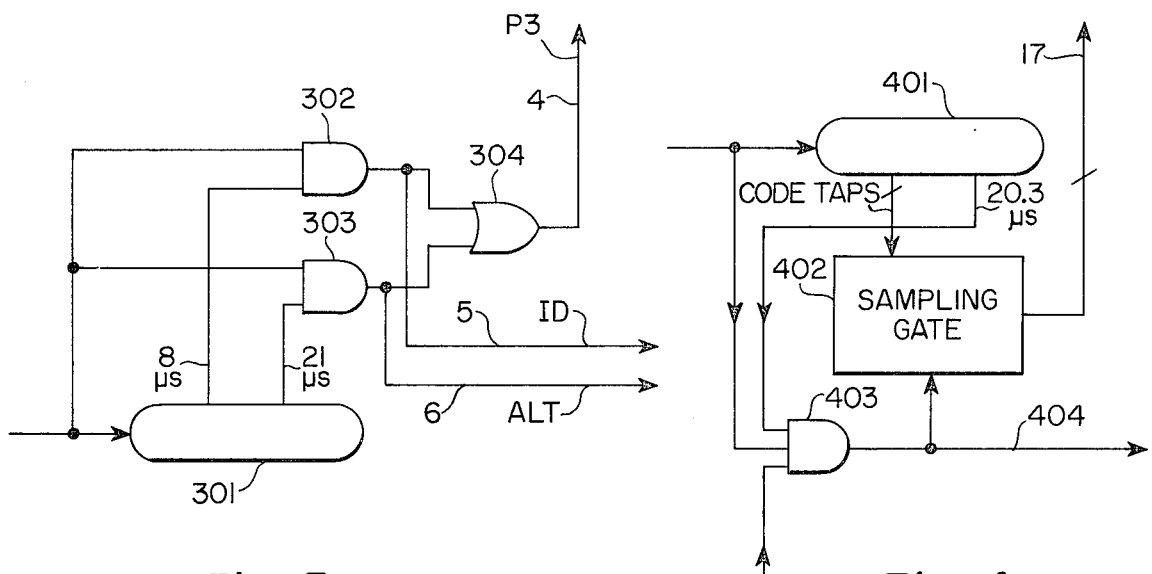
Fig. 3                    Fig. 4

COLLISION AVOIDANCE SYSTEM

BACKGROUND

1. Field

This invention relates to system for indicating proximity of an Own station to any Other station that is equipped with a standard ATCRBS transponder. More specifically, the invention pertains to threat warning and collision avoidance systems for aircraft.

2. Prior Art

Many collision avoidance systems (CAS) using airborne transponder signals have been proposed. Some of these have been built and tested with varying degrees of success. The simplest systems merely receive Others' transponder replies, relying on the received signal strength to determine approximate range from Own. Other systems depend on two-way transmissions between Own and Other's transponder to provide range information. Said systems are subject to unacceptably high false alarm rates, particularly in dense aircraft environments, where reliable warnings are most needed. Still other systems involve airborne radio direction finding from Own to Other's transponders. Suitable direction finders have not been implemented, and are probably infeasible in the present state of the art.

Other systems, using the time delay between reception at 0wn's station of an interrogation message from a particular SSR and reception of an Other reply to said interrogation, are described in numerous patents, for example the following: U.S. Pat. Nos. 3,626,411, 3,858,211, 3,735,408, 3,875,570, 3,757,324, 4,021,802, 3,858,210.

These systems discriminate strongly against false alarms and provide various information about possible threats, such as range, bearing, differential altitude and identity. In general, the complexity of such a system is directly related to its capability.

There is a current and compelling need for collision avoidance systems suitable for light aircraft such as those used in general aviation. Such systems have been designated TCAS-1. They must provide basically adequate collision threat warnings, but must also be simple and economically feasible for the owners of light aircraft. A paramount requirement is that they must minimize false alarms.

SUMMARY

According to this invention, an Own station receives interrogations from at least one SSR, and usually several SSR within operating range, not only when the main beam of an SSR is pointing at it but also when Own station is illuminated by a side lobe of the main beam. During a brief period, sometimes called a "listen-in" period, Own station receives replies transmitted by transponders at Other stations in the general vicinity of Own station in response to each interrogation from an SSR. The received replies are decoded to produce identification and differential time of arrival, hereinafter denoted T, and when available, differential altitude associated with each said Other station.

The identities and corresponding data are stored for several interrogation repetition periods in a running fashion, updating the storage periodically by replacing the oldest currently stored information with the newest decoded information. Identities and related data that are duplicated or approximately duplicated a predetermined number of times during a storage period are selected and stored separately for a length of time at least as long as the longest SSR beam rotation period. Those identities and associated data not so duplicated are discarded.

From the remaining stored correlated groups of identity and data those containing differential altitudes greater than a predetermined value are discarded; of those remaining that relate to a common identity but contain different values of T, only the largest value of T is selected. Whenever any such selected largest value of T is less than a predetermined value a warning or threat alert signal is produced. The quantitative value of an alarm-producing T and the associated identity and differential altitude may also be displayed.

Preferably the display of T is in terms of distance, i.e., one-half the distance radiation travels during time T. This distance is hereinafter denoted as psuedo range, and corresponds to the actual range to a degree that depends upon the positional relationships between Own and Other stations and the SSR. The psuedo range is never greater than the actual range. When Own and Other stations are both interrogated by a number of SRRs, the largest value of the psuedo range associated with a particular Other may closely approximate the actual range of said Other.

DRAWINGS

FIG. 2 is a geometric diagram used in the explanation of the operation of the system of FIG. 1 with two favorably located SSRs.

FIG. 3 is a schematic diagram of an interrogation decoder in the apparatus of FIG. 1.

FIG. 4 is a schematic diagram of a reply decoder in the apparatus of FIG. 1.

DESCRIPTION

Figure 1:
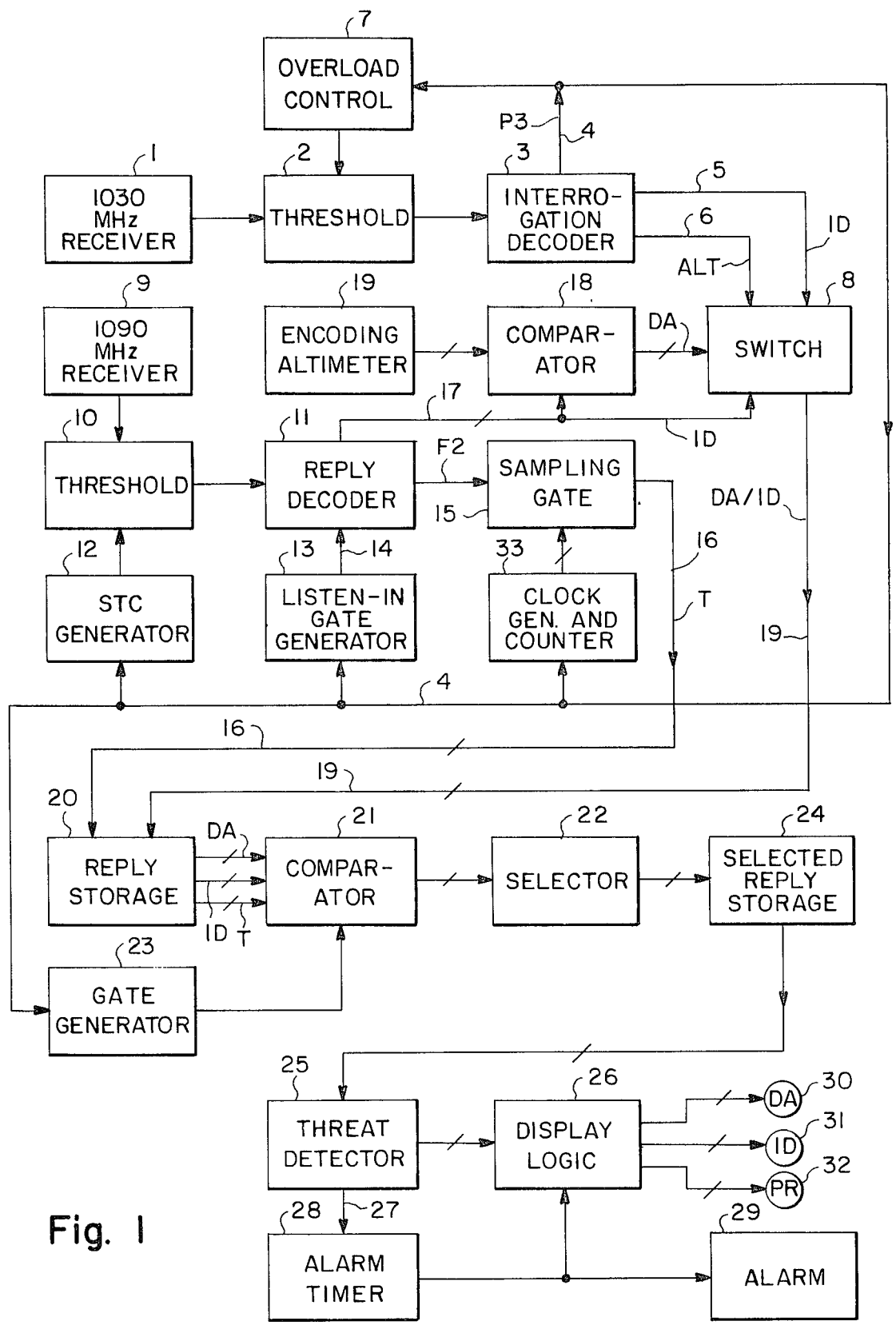
FIG. 1 is a block diagram of the equipment at an Own station in a presently preferred embodiment of the invention.

Referring to FIG. 1, a receiver 1 is designed to receive standard ATCRBS interrogations. It may be similar to the usual transponder receiver but about 20 db more sensitive. The output of receiver 1 is applied to a threshold device 2 arranged to pass any output from receiver 1 exceeding the threshold level to an interrogation decoder 3. Decoder 3 provides an output on line 4 representing the P3 pulse of each received and decoded interrogation. Line 4 goes to an overload control circuit 7 arranged to control the threshold level of device 2, as in a standard ATCRBS transponder.

Decoder 3 is designed to provide an output on line 5 when an identity (mode A) interrogation is received or an output on line 6 when an altitude (mode C) interrogation is received. These outputs are applied as control inputs to a switch circuit 8.

A receiver 9, designed to receive standard transponder reply signals, is connected by way of a threshold device 10 to a reply decoder 11. The threshold device 10 is similar to the device 2, but its threshold level is controlled by a sensitivity time control (STC) generator 12. STC generator 12 is controlled by P3 pulses on line 4 to initially provide a relatively high threshold level, and then reduce the level over a period of, say 5 microseconds, thereafter maintaining the lower level until the next P3 pulse occurs.

A "listen-in" gate generator 13 is connected to line 4 and arranged to produce a gate signal of about 200 microseconds duration following each P3 pulse. The gate signal on line 14 enables reply decoder 11, which in the absence of the gate signal is disabled. When enabled, decoder 11 produces an output pulse corresponding to the final framing pulse F2 of any reply passing the threshold device 10. The F2 output of decoder 11 goes to sampling gate 15.

A clock generator and counter 33 is arranged to be reset by each P3 pulse on line 4, and to apply the current count, which may be a numerical representation of the number of microseconds elapsed since the last preceding P3 pulse, to gate 15. Each F2 pulse applied to gate 15 transfers the current count to line 16. The output of gate 15 on line 16 represents the differential time of arrival T of a received interrogation and the corresponding received reply from a transponder at an Other station.

The reply decoder produces an output on line 17 representing either the identity or the altitude information contained in the current reply message. This output is applied to an altitude comparator 18 and to switch circuit 8. An encoding altimeter 79 provides a representation of Own's altitude encoded in similar format. Comparator 18 produces an output representing the difference between Own's and Other's altitudes when a mode C reply occurs. The output of comparator 18 in response to a mode A reply will be spurious. In either case the output of comparator 18 is an information input to switch circuit 8.

Multiple line 17 is connected to supply all decoded outputs, both altitude and identity, from decoder 11 as information inputs to switch circuit 8. When a identity interrogation is received, line 5 is energized to actuate switch 8 to pass the identity message to switch output line 19. The output of comparator 18 at this time is discarded. When an altitude interrogation message is received, decoder 3 energizes line 6, thereby actuating switch circuit 8 to apply the output of comparator 18 to line 19, discarding the input from line 17.

Lines 16 and 19 go to a reply storage device 20, which may comprise a plurality of digital registers arranged in known manner to store associatively the T and identity or differential altitude information corresponding to approximately 20 successive reply messages. Preferably, the differential altitude is stored associatively with the identity and differential time of arrival data. The information contained in each new reply message displaces the oldest such stored information, so the storage device 20 maintains a running account of identification and associated T and differential altitude information.

A comparator 21, when enabled, compares the associated entries in storage device 20 with each other to select those nearly identical entries that appear currently in the reply storage device 20. When such a match occurs the respective entry is transferred to a selector device 22. A gate generator 23, similar to the listen-in gate generator 13, is arranged to enable the comparator 21 for a period beginning at the end of the listen-in gate and enduring long enough for completion of the operation of comparator 21.

The output of comparator 21 may, and generally will, include several entries containing the same identity information but substantially different T information. The selector 22 rejects all such entries except the one containing the largest T, which it transfers, together with the associated identity and differential altitude information, to a selected reply storage device 24. Storage device 24 is similar to device 20, but retains its entries for a period somewhat longer than the longest radar beam rotation period to be expected, say 15 seconds. If during that time a new entry with a larger value of T is presented, the new larger value of T is substituted for the old, smaller value associated with that particular identity. A new entry with a different differential altitude will also substitute the new differential altitude value for the former value.

The storage device 24 is connected to a threat detector 25. Detector 25 is designed to transfer any entry containing a differential altitude of less than 3000 feet and a T less than 36 microseconds to a display logic device 26. At the same time detector 25 provides an output on line 27 to start an alarm timer circuit 28 which may be similar to the listen-in gate generator 13, but designed to provide an output lasting, for example, about 10 seconds. The output of time 28 enables display logic device 26 and actuates an alarm device 29.

The display logic device 26 converts the output of detector 25 to a form suitable for display on a differential altitude indicator 30, an identity indicator 31 and a psuedo range indicator 32. The psuedo range indication is a display of the differential time of arrival T in terms of distance.

Referring to FIG. 3, the interrogation decoder 3 of FIG. 1 consists of a delay line 301, AND gates 302 and 303, and OR gate 304, connected as shown. Delay line 301 is tapped to provide delays of 8 microseconds and 21 microseconds, corresponding to the delays by which the P3 pulse follows the P1 pulse in mode A and mode C interrogations respectively.

The circuit of FIG. 3 is similar to, and operates in substantially the same manner as the interrogation decoder of a standard transponder, with the exception that no provision is made for decoding the side lobe suppression (SLS) P2 pulse, since SLS is not used in the system of FIG. 1. In this connection it is noted that the receiver 1 of FIG. 1 may form part of a transponder at Own station, by providing an additional threshold device set approximately 20 db higher than the device 2 of FIG. 1 and connected to an interrogation decoder of the usual type with SLS.

Referring to FIG. 4, the reply decoder 11 of FIG. 1 comprises a multiple tapped delay line 401, a sampling gate 402, and an AND gate 403, connected as shown. The foregoing elements and their interconnections may be the same as those in the reply decoder of the usual ground based SSR, with the addition of an input to gate 403 on line 14. While enabled by a listen-in gate signal on line 14 the circuit produces an output on multiple line 17 numerically representing currently received Others reply message, and outputs the final framing pulse F2 on line 404.

In the operation of the system of FIG. 1, interrogation messages reach decoder 3 not only during, but also before and after passage of the main beam of an SSR through Own's location, owing to the relatively high sensitivity of receiver 1, the relatively low threshold of device 2 and the omission of SLS beams, which combine to provide response to primary and reflected side lobes as well as the main beam. As a result, the advantages of widened azimuth sector operation, as described in U.S. Pat. No. 3,735,408, are obtained without requiring the additional equipment described therein.

When Own station is relatively near an SSR, many of the received side lobes will be strong enough to pass the threshold 2, providing operation of the system throughout a relatively large angular sector, thus allowing comparison with replies from Other stations within a range of several miles from Own. When Own station is more distant from the SSR the weaker side lobes are not passed by the threshold 2, effectively narrowing the angular extent of the monitored azimuth sector. Finally, when Own station is remote from the SSR, none of the side lobes pass the threshold and the monitored sector is the same as the width of the main beam. The automatic narrowing of the azimuth sector with increasing distance from the SSR maintains the geographic width of the monitored area more or less constant at several miles, thereby eliminating response of the system to transmissions from Others outside said area.

Referring to FIG. 2, which is a plan or map-like representation, an Own, an Other and two SSRs are located as shown. Line 201 represents the distance from SSR-1 to Own, line 202 represents the distance from SSR-1 to Other, and line 203 represents the range between Own and Other. The differential time of arrival T1 in this case is the difference between the sum of the travel times over paths 202 and 203 and the travel time over path 201, generally expressed in microseconds. Any particular time T1 defines an ellipse such as 204, which is a locus of Other's position, i.e., time T1 signifies only that Other is at some unspecified point on ellipse 204.

It will be seen in FIG. 2 that lines 201 and 202 are approximately parallel and thus T1 is very nearly twice the propagation delay along line 203, the true range between Own and Other. Thus (cT1)/2, referred to herein as the psuedo range associated with SSR-1, is essentially equal to the true range, where c is the propagation velocity.

Line 205 represents the distance from SSR-2 to Other. In this case the differential time of arrival T2 defines ellipse 207 as a locus of Other's position. Owing to the positional relationship between Own, Other and SSR-2 the psuedo range associated with SSR-2, that is (cT2)/2, cT2 is considerably less than the true range, and may be shown to be a little more than one-half the true range. Regardless of the relative positions of Own and any Other station and any SSR, the psuedo range can never be greater than the true range and generally will be somewhat less. Therefore, in a multiple SSR environment the largest determined psuedo range to a particular Other is always selected as the value most nearly equal to the true range.

When an Other station is much closer to the SSR than Own station the psuedo range may become a small fraction of the true range and, if the Other is within the differential altitude limits, may initiate a threat detection when in fact no threat exists. Such false threats are minimized by the action of the STC generator 12 of FIG. 1 controlling the threshold device 10 to reject relatively weak replies received within a few microseconds after reception of an interrogation.

What is claimed is:

1. A collision avoidance system at an Own station, including:
   (a) means for receiving interrogation messages transmitted by each SSR within operational range of said Own station when said Own station is within the main beam of an SSR and also when said Own station is within a side lobe of said main beam,
   (b) means for receiving reply messages transmitted by any transponder-equipped Other station in response to such interrogation messages during a predetermined period following reception of each interrogation message at said Own station,
   (c) means for identifying each said Other station according to its reply messages,
   (d) means for determining, from the time relationships between each said received interrogation message and each said received reply message elicited thereby, differential time of arrival data for each of said identified Other stations with respect to each said SSR,
   (e) means for storing as entries in a running account each successive identity obtained by means (c) and the corresponding time of arrival data obtained by means (d) for a predetermined number of interrogation repetition periods,
   (f) means for matching from the entries in means (e) those identities and corresponding data that are substantially duplicated a predetermined number of times,
   (g) means for storing the entry for each such matched identity and corresponding data for a storage period at least as long as the longest SSR beam rotation period,
   (h) means for selecting the largest differential time of arrival related to each said identified Other station stored in means (g), and
   (i) means for producing a threat alert in response to any such selected differential time of arrival below a predetermined value.

2. The system set forth in claim 1, further including an altimeter and means responsive thereto and to each said received reply message that carries Other's altitude information, to determine the differential altitude of each said identified Other station with respect to the Own station, wherein said means (e) further includes means for storing as entries said differential altitude data, and said system further includes means for discarding all stored correlated groups of identity and data containing differential altitudes greater than a predetermined value.

3. The system set forth in claim 1 or claim 2, further including sensitivity time control means responsive to each interrogation message received by said means (a) to increase the sensitivity of said means (b) from a predetermined minimum to a predetermined maximum during a predetermined interval following reception of each said interrogation message.

4. The system set forth in claim 1 or claim 2, further including overload control means responsive to the number of interrogation messages received by said means (a) during a predetermined interval to reduce the sensitivity of said means (a) whenever said number reaches a predetermined value.

5. The system set forth in claim 1 or claim 2, further including means for displaying a psuedo range value of any differential time of arrival associated with a threat alert produced by said means (i).

6. The system set forth in claim 1 or claim 2, further including means for displaying the identity of any said Other station associated with a threat alert produced by said means (i).

7. The system set forth in claim 2, further including means for displaying the differential altitude of any said Other station associated with a threat alert.

8. A method of monitoring a space surrounding an Own station for the proximity of transponder-equipped Other stations, including the steps of (a) receiving interrogation messages transmitted by each SSR within operational range of said Own station when said Own station is within the main beam of an SSR and also when said Own station is within a side lobe of said main beam, (b) receiving reply messages transmitted by any transponder-equipped Other station in response to such interrogation messages during a predetermined period following reception of each interrogation message at said Own station, (c) identifying each said Other station according to its reply messages, (d) determining, from the time relationships between each said received interrogation message and each said received reply message elicited thereby, differential time of arrival data for each of said identified Other stations with respect to each said SSR, (e) storing as entries in a running account each successive identify obtained during step (c) and the corresponding time of arrival data obtained by step (d) for a predetermined number of interrogation repetition periods, (f) matching from the entries of step (e) those identities and corresponding data that are substantially duplicated a predetermined number of times, (g) storing the entry for each such matched identity and corresponding data for a storage period at least as long as the longest SSR beam rotation period, (h) selecting the largest differential time of arrival related to each said identified Other station stored by step (g), and (i) producing a threat alert in response to any such selected differential time of arrival below a predetermined value.

9. The method set forth in claim 8, further including the steps of determining the differential altitude of each said identified Other station with respect to the Own station, storing as entries said differential altitude data associatively with said identity and differential time of arrival data, and discarding all stored correlated groups of identity and data containing differential altitudes greater than a predetermined value.

10. A collision avoidance system at an Own station, comprising:

(a) means for receiving interrogation messages transmitted by each SSR within operational range of said Own station, (b) means for receiving reply messages transmitted by transponder-equipped Other stations in response to such interrogation messages during a predetermined period following reception of each interrogation message by said Own station, (c) means for identifying each of said Other stations according to its reply messages, (d) means for determining from said received interrogation and reply messages a differential time of arrival (T) value for each said identified Other station with respect to each said SSR, (e) means for associatively storing identities and corresponding T values for several of the most recent reply messages, (f) means for selecting the largest T value related to each said identified Other station from among those identities and corresponding T values that are substantially duplicated a predetermined number of times, and (g) means for producing a threat alert output in response to any such selected T value below a predetermined value.

11. The system set forth in claim 10, further comprising:

(h) means responsive to an altimeter output at Own station and to each reply message containing altitude information received by means (b) for determining a differential altitude value for each said identified Other station with respect to the Own station, (i) means for associatively storing the differential altitude values with identity and T values stored in means (e), and (j) means for ignoring stored correlated groups of identity and values containing differential altitudes greater than a predetermined value, whereby means (g) will not produce a threat alert output in response to said ignored correlated groups.

12. The system set forth in claim 10 or claim 11, further comprising:

sensitivity time control means responsive to each interrogation message received by said means (a) to increase the sensitivity of said means (b) from a predetermined minimum to a predetermined maximum during a predetermined interval following reception of each said interrogation message.

13. The system set forth in claim 10 or claim 11, further comprising overload control means responsive to the number of interrogation messages received by said means (a) during a predetermined interval to reduce the sensitivity of said means (a) whenever said number reaches a predetermined value.

14. The system set forth in claim 10 or 11 further comprising alarm device means for producing a threat alert in response to said threat alert output.

15. The system set forth in claim 14 further comprising an indicator means for displaying a psuedo range value of any T value associated with said threat alert output.

16. The system set forth in claim 15 wherein said indicator means includes a device for displaying the identity and differential altitude value of any said Other station associated with said threat alert output.

17. A collision avoidance system at an Own station, comprising:

(a) means for producing from received interrogation messages transmitted by each SSR within operational range of said Own station and received reply messages transmitted by transponder-equipped Other stations in response to said interrogation messages during a predetermined period following reception of each said interrogation message by Own station, a differential time of arrival value for each of said Other stations with respect to each said SSR;

(b) means for selecting, from among the several most recent differential time of arrival values produced by means (a), the largest differential time of arrival value associated with each said Other station that has been substantially duplicated a predetermined number of times; and (c) means for producing a threat alert output in response to any time of arrival value selected by means (b) that is below a predetermined value.

18. The system as set forth in claim 17 further comprising means for storing the several most recent differential time of arrival values produced by means (a).

19. The system as set forth in claim 17 further comprising:
means responsive to an altimeter at Own station and to said received reply messages containing altitude information for producing a differential altitude value for each said identified Other station with respect to the Own station, and
means for rendering the system unable to generate said threat alert output in response to differential time of arrival values associated with any of said Other stations whose differential altitude values are greater than a predetermined amount.

20. A method for detecting at Own station the proximity of a transponder-equipped Other station, comprising the steps of:
(a) producing, from received interrogation messages transmitted by each SSR within operational range of said Own station and received reply messages transmitted by any transponder-equipped Other stations in response to said interrogation messages during a predetermined period following reception of each said interrogation message by Own station, a differential time of arrival value for each of said Other stations with respect to each said SSR;
(b) selecting, from among the several most recent differential time of arrival values produced by step (a), the largest differential time of arrival value associated with each said Other station that has been substantially duplicated a predetermined number of times; and
(c) producing a threat alert output in response to any time of arrival value selected by step (b) that is below a predetermined value.

21. The method set forth in claim 20, further comprising the step of:
storing the several most recent differential time of arrival values produced by step (a).

22. The method as set forth in claim 20 further comprising the steps of:
producing, in response to the output of an altimeter at Own station and to said received reply messages containing altitude information, a differential altitude value for each said identified Other station with respect to said Own station, and
ignoring differential time of arrival values associated with any Other station whose differential altitude value is greater than a predetermined amount such that step (c) will not produce a threat alert output in response to said ignored differential time of arrival values.

23. A method for detecting at Own station the proximity of a transponder-equipped Other station, comprising the steps of:
(a) receiving interrogation messages transmitted by each SSR within operational range of said Own station,
(b) receiving reply messages transmitted by transponder-equipped Other stations in response to such interrogation messages during a predetermined period following reception of each interrogation message by said Own station,
(c) identifying each of said Other station according to its reply messages,
(d) determining from said received interrogation and reply messages a differential time of arrival (T) value for each said identified Other station with respect to each said SSR,
(e) associatively storing identities and corresponding T values for several of the most recent reply messages,
(f) selecting the largest T value related to each said identified Other station from among those identities and corresponding T values that are substantially duplicated a predetermined number of times, and
(g) producing a threat alert output in response to any such selected T value below a predetermined value.

24. The method set forth in claim 23, further comprising the steps of:
(h) determining, in response to an altimeter output at Own station and to each received reply message containing altitude information a differential altitude value for each said identified Other station with respect to the Own station,
(i) associatively storing the differential altitude values with identity and T values stored by step (e), and
(j) ignoring stored correlated groups of identity and values containing differential altitudes greater than a predetermined value, whereby step (g) will not produce a threat alert output in response to said ignored correlated groups.

25. The method set forth in claim 23 or claim 24, further comprising the step of:
sensitivity time control means responsive to each interrogation message received by said means (a) increasing the sensitivity of the reception to reply messages in step (b) from a predetermined minimum to a predetermined maximum during a predetermined interval following reception of each said interrogation message.

26. The method set forth in claim 23 or claim 24, further comprising the step of:
reducing the sensitivity of the reception of interrogation messages in step (a) in response the number of interrogation messages received during a predetermined interval.

27. In a collision avoidance system at an Own station, an apparatus for receiving interrogation messages transmitted by each SSR within operational range of said Own station when said Own station is within the main beam of an SSR and also when said Own station is within a side lobe of said main beam, comprising:
(a) an extra-sensitive 1030 MHz receiver at said Own station for receiving SSR interrogation messages when said Own station is within the main beam of an SSR and also when said Own station is within a side lobe of said main beam; and
(b) means for decoding the output from said receiver to produce an interrogation received signal whenever the presence of a P1 pulse and a P3 pulse in said output is detected without regard to the presence of the side lobe suppression P2 pulse between said P1 and P3 pulses,
thereby enabling said collision avoidance system to monitor interrogation messages in an azimuth sector substantially wider than the main beam of each SSR.

28. The apparatus set forth in claim 27 further comprising:
(c) threshold means for allowing means (b) to decode said output only if said output exceeds a predetermined threshold level.

29. The apparatus set forth in claim 28 further comprising:

(d) automatic overload control means responsive to the number of interrogation messages in said widened azimuth sector received by means (a) during a predetermined interval to reduce the sensitivity of threshold means (c) whenever said number reaches a predetermined value.

30. The apparatus set forth in claim 28 wherein said 1030 MHz receiver has a sensitivity of about −92 dbm.

31. In a collision avoidance system at an Own station, a method for receiving interrogation messages transmitted by each SSR within operational range of said Own station when said Own station is within the main beam of an SSR and also when said Own station is within a side lobe of said main beam, comprising:
(a) receiving SSR interrogation messages at said Own station with an extra-sensitive 1030 MHz receiver when said Own station is within the main beam of an SSR and also when said Own station is within a side lobe of said main beam; and
(b) decoding the output from said receiver to produce an interrogation received signal whenever the presence of a P1 pulse and a P3 pulse in said output is detected without regard to the presence of a side lobe suppression P2 pulse between said P1 and P3 pulses, thereby enabling said collision avoidance system to monitor interrogation messages in an azimuth sector substantially wider than the main beam of each SSR.

32. The method set forth in claim 31 wherein said output is decoded only if it exceeds a predetermined threshold level.

33. The method set forth in claim 32 further comprising the step of:
(c) reducing the sensitivity of said apparatus by automatically increasing said threshold level whenever the number of interrogation messages in said widened azimuth sector received by said 1030 MHz receiver during a predetermined interval reaches a predetermined value.

34. The method set forth in claim 32 wherein said 1030 MHz receiver employed in step (a) has a sensitivity of about −92 dbm.

* * * * *